United States Patent [19]

Koren

[11] Patent Number: 5,424,883
[45] Date of Patent: Jun. 13, 1995

[54] SIGNAL CHANNEL EQUALIZER AND METHOD OF MAKING SAME

[75] Inventor: Norman L. Koren, Encinitas, Calif.

[73] Assignee: Eastman Kodak Company, Rochester, N.J.

[21] Appl. No.: 199,351

[22] Filed: Feb. 18, 1994

Related U.S. Application Data

[63] Continuation of Ser. No. 891,010, Jun. 1, 1992, abandoned.

[51] Int. Cl.$^6$ ............................................. G11B 5/035
[52] U.S. Cl. ..................................................... 360/65
[58] Field of Search ..................... 360/46, 40, 51, 113, 360/65, 67, 68; 375/11, 14, 99, 101; 333/28 R

[56] References Cited

U.S. PATENT DOCUMENTS

| | | |
|---|---|---|
| 3,493,694 | 2/1970 | Hunt . |
| 3,840,898 | 10/1974 | Bajorek et al. . |
| 4,972,276 | 11/1990 | Wadaya et al. ............... 360/66 |
| 4,987,508 | 1/1991 | Smith . |
| 5,166,838 | 11/1992 | Fuji et al. ........................ 360/46 |

OTHER PUBLICATIONS

Dovek et al. "Performance comparison of UMR and SMR heads for digital tape recording" Sep., 1992.
Signal Processing In Recording channels Utilizing Unshielded Magnetoresistive Heads, N. L. Koren, IEEE Trans. Magn, vol. MAG-26, No. 5, Sep. 1990, pp. 2166.
8/10 Modulation Codes for Digital Magnetic Recording, S. Fukuda et al, IEEE Magn., vol. Trans. MAG-22, No. 5, Sep. 1986.
Magnetic Recording Handbook, Nee and Daniel, McGraw-Hill Publishing Company, 1990, p. 1118-1119 and 1122-1123.

*Primary Examiner*—Donald Hajec
*Assistant Examiner*—Le Thien Minh
*Attorney, Agent, or Firm*—William F. Noval

[57] ABSTRACT

In a magnetic playback system using an unshielded MR head and a d.c. free charge constrained recording code, the present invention discloses a playback equalizer and the method of making the equalizer whose response to an isolated pulse, unlike the narrow unidirectional pulse response known in the prior art, is a bidirectional signal having a steep zero crossing corresponding to the peak of an isolated pulse. The bidirectional signal is further characterized by skirts resulting from the excellent low frequency of the unshielded MR head, and, unlike the teaching of the prior art, these skirts overlap contiguous pulse periods without causing intersymbol interference. In combination with the characteristics of the patterns of the d.c. free charge constrained code, the presence of the skirts eliminates false zero crossings by maintaining the signal level above the system base line except at the time of a true signal crossing. This allows signal detection by means of a single zero crossing detection channel, and obviates the necessity for a second channel serving as an amplitude qualifier.

11 Claims, 5 Drawing Sheets

SIGNAL CHANNEL EQUALIZER AND METHOD
OF MAKING SAME

This is a continuation application of prior application Ser. No. 891,010, filed Jun. 1, 1992, now abandoned.

BACKGROUND OF THE INVENTION

1. Field of the Invention

This invention relates to a magnetic playback signal channel, and in particular to equalization of a signal channel utilizing a magnetoresistive playback head.

2. Description of the Prior Art

The invention, as well as the prior art, will be described with respect to the figures, of which:

Figure 2A:
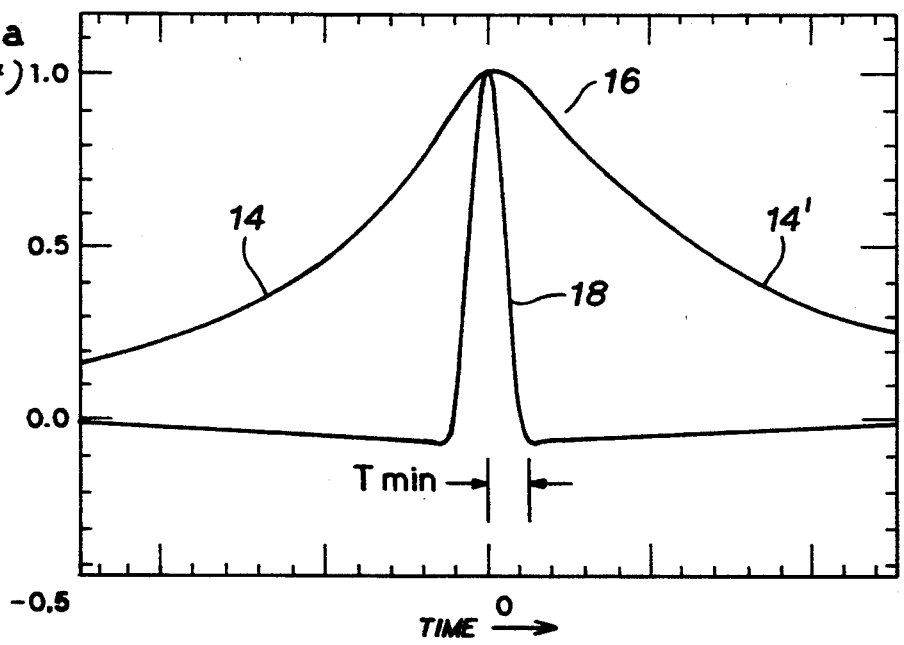
FIG. 2a is a plot of the time response of an unshielded magnetoresistive head of an isolated pulse and an ideal equalized isolated pulse of the prior art.
Figure 2B:
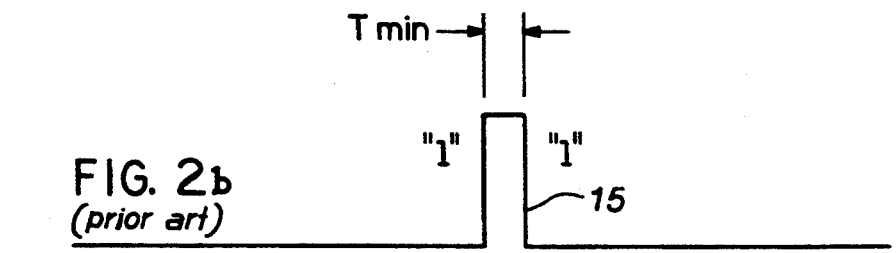
Figure 3:
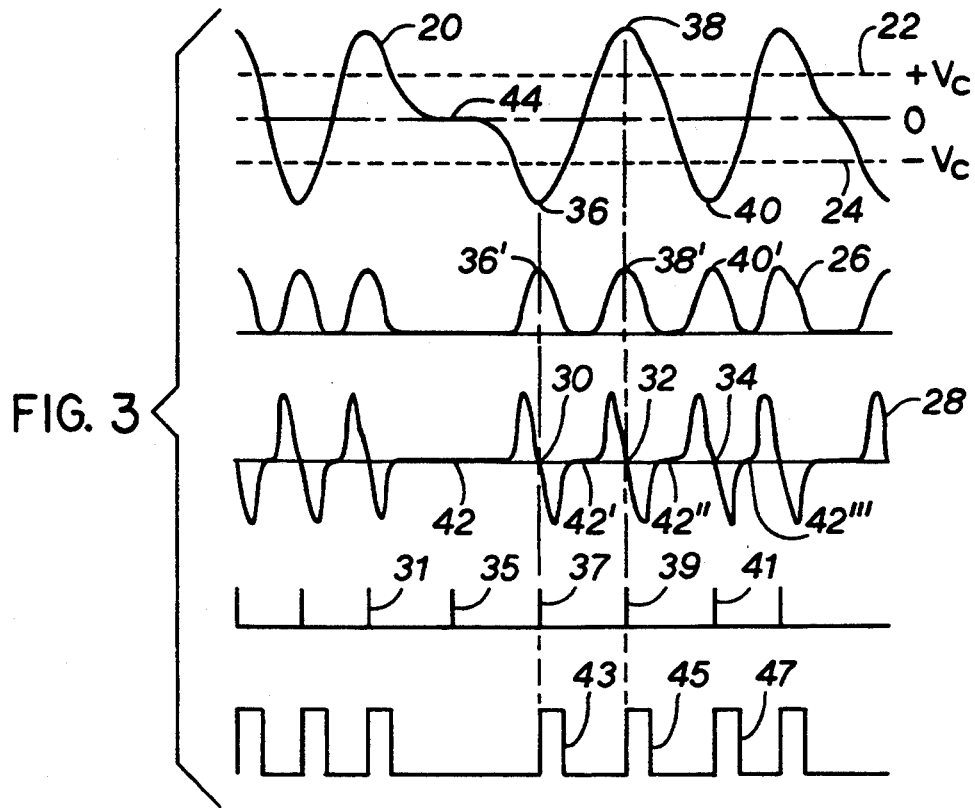
Figure 4:
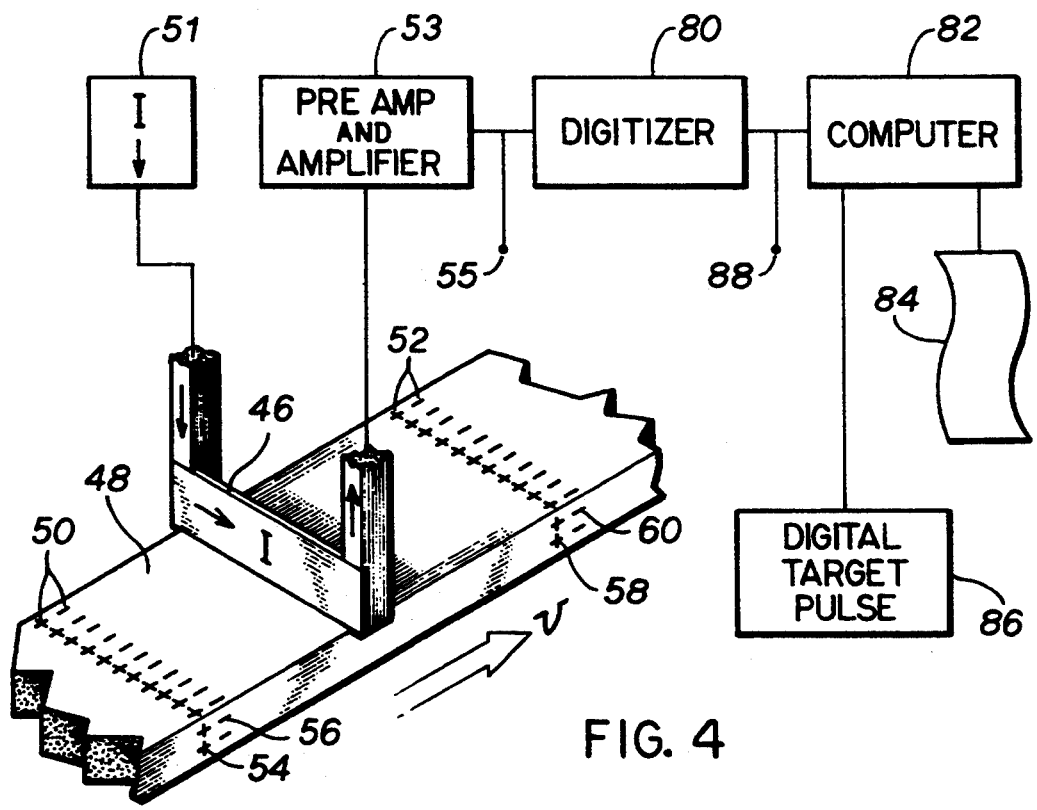
Figure 5:
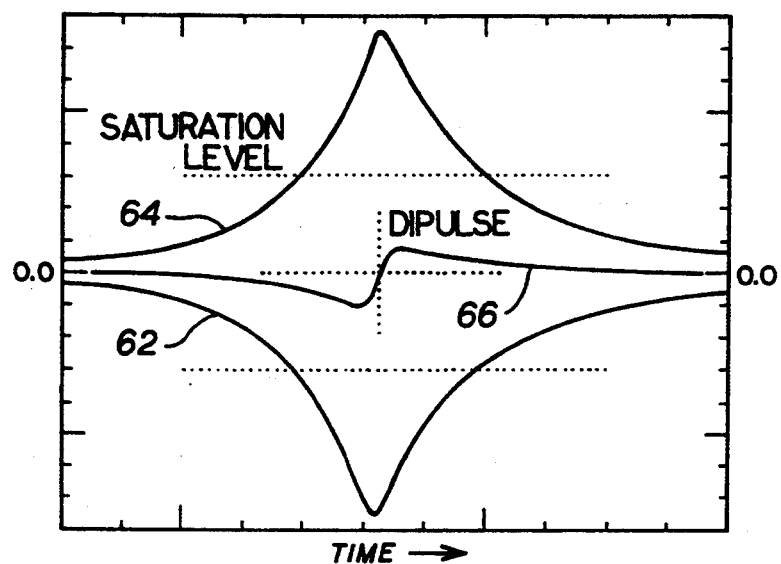
Figure 6:
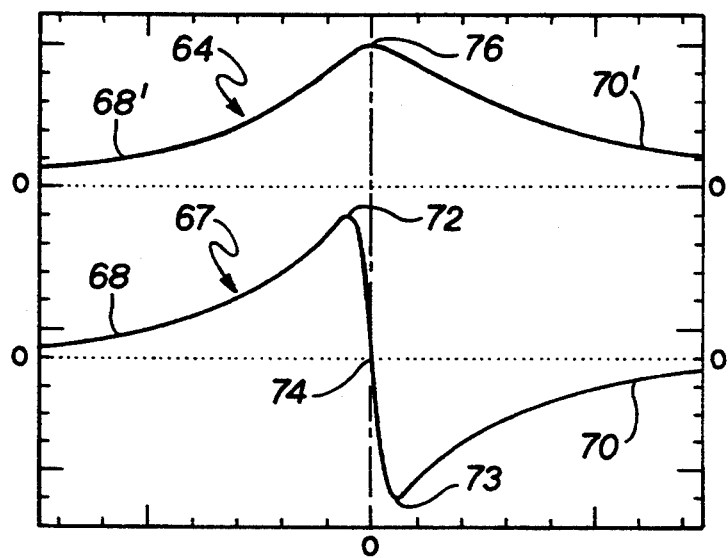
Figure 7:
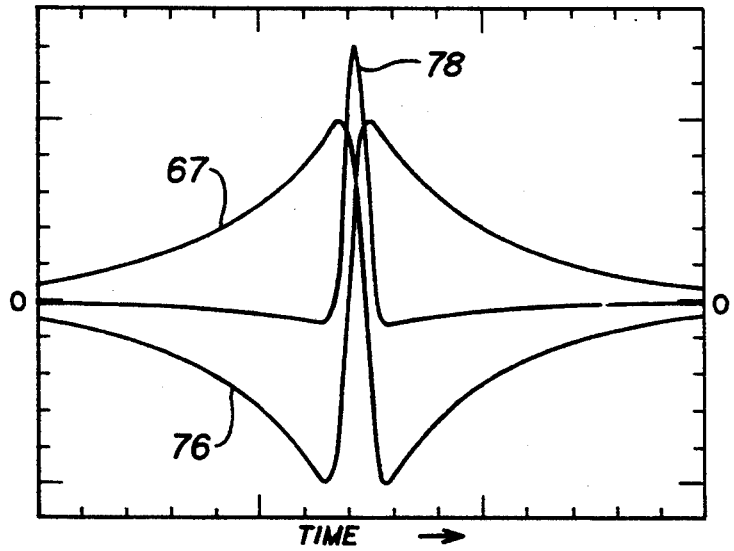
Figure 8:
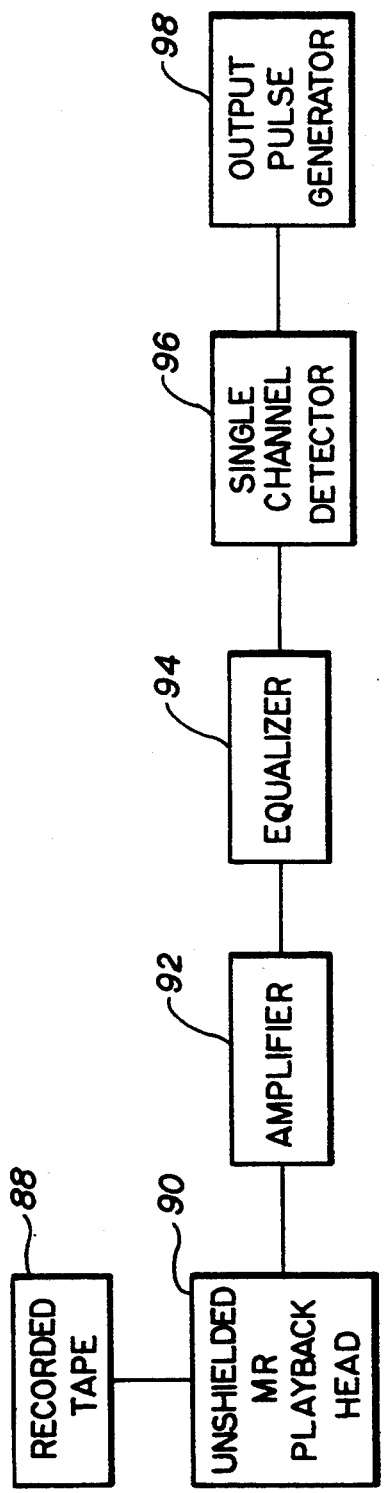
Figure 9:
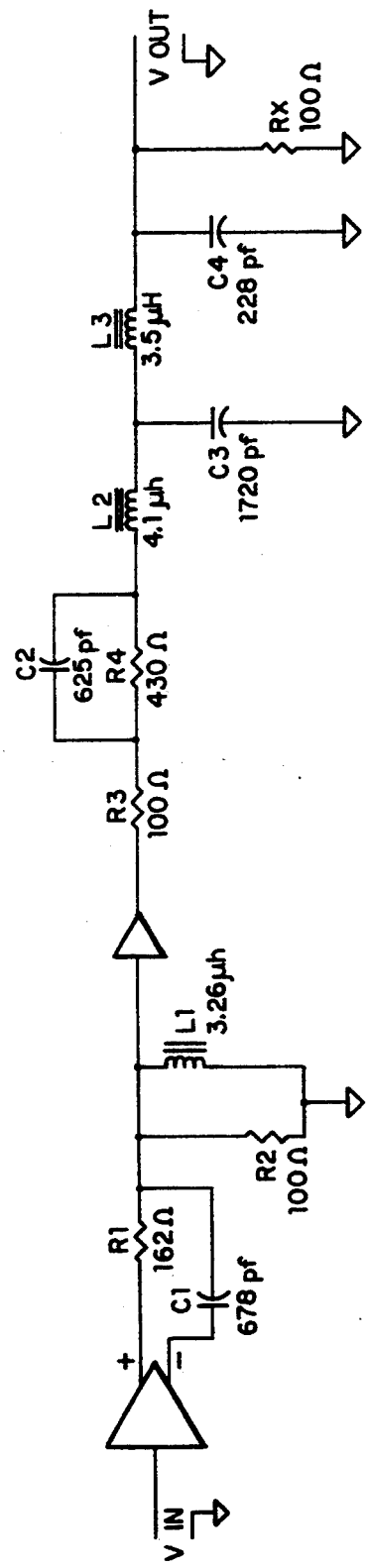
Figure 10:
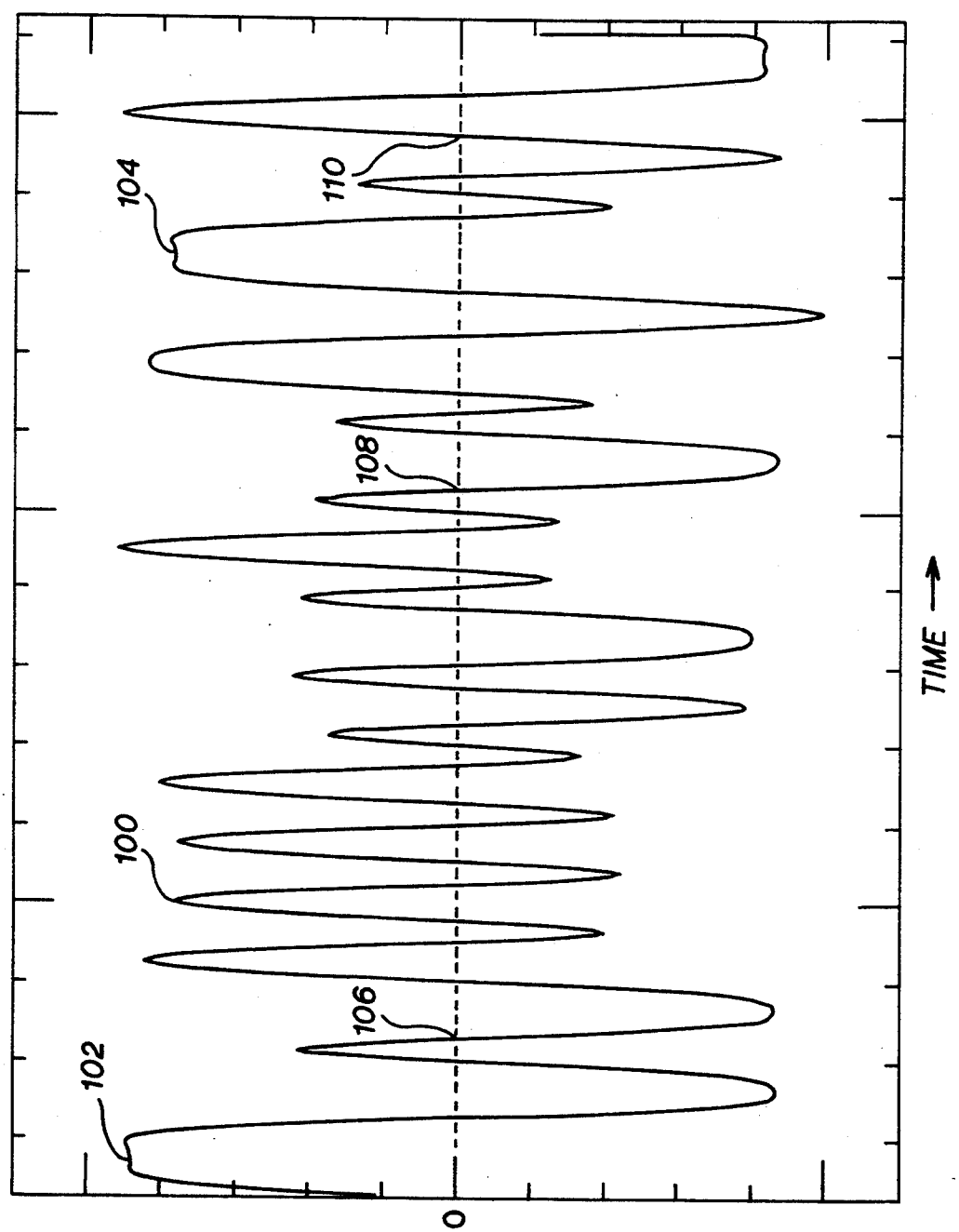

FIG. 2b illustrates the recording current waveform for two contiguous "1's" of a (O, k) modulation code, FIG. 3 illustrates waveforms of a two channel detector known in the prior art, FIG. 4 illustrates apparatus used in the practice of the present invention, FIG. 5 is a plot of the response of an unshielded magnetoresistive head to a dipulse, FIG. 6 is a plot of waveforms useful in understanding the present invention, FIG. 7 is a plot of waveforms useful in the design of the equalizer of the invention, FIG. 8 is a block diagram of apparatus for reproducing magnetically recorded signals in accordance with the invention, FIG. 9 is a schematic drawing of an equalizer in accordance with the invention, and FIG. 10 is a plot of the response of a single channel detector utilizing the equalizer of the invention for a charge constrained (d,k) code.

The magnetoresistive (MR) reproduce head is well known in the art. Its high signal output, excellent short wavelength response, and ease of manufacture by batch fabrication techniques have made it an attractive candidate for use in modern digital data storage devices. Since its disclosure in U.S. Pat. No. 3,493,694, issued in the name of R. P. Hunt, the unshielded MR head has been improved and elaborated upon; U.S. Pat. Nos. 3,840,898 and 4,987,508 reflect two of such improvements and elaborations.

Figure 1:
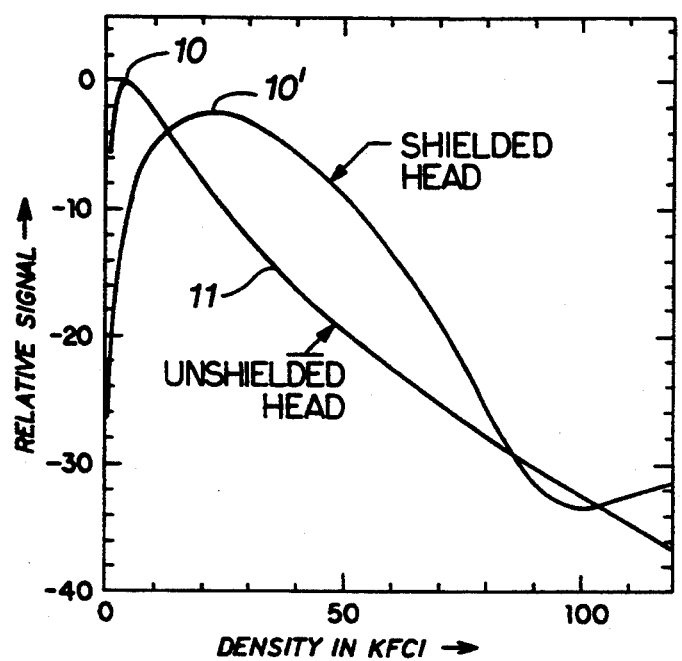
FIG. 1 is a plot of magnetoresistive head wavelength responses known in the prior art.

Referring to FIG. 1, it is seen that the unshielded MR head response 11 has considerably higher maximum output 10 at long wavelengths than the maximum output 10' of an equivalent shielded MR head. This occurs in the unshielded head because the flux from a long wavelength signal transition influences the MR element across its entire height, while the flux from a short wavelength signal transition is intercepted at the element only in the region of the head to tape interface. As current applications of the unshielded MR head are typically for short wavelength use, i.e. 80 kfci and above, and because difficulty was generally experienced in the prior art in equalizing the unshielded MR head over the broad signal frequency range characteristic of the head, the shielded MR head was developed wherein shields were added on either side of the MR element to reduce the sensitivity of the MR head to long wavelength signals. Thus for the shielded MR head, decreased difficulty in equalization was attained at the expense of increased fabrication complexity when compared to the unshielded MR head.

In modern magnetic recording systems, data is often encoded using run length limited codes, generically designated as (d,k) codes. They are extensions of earlier non return to zero modulation codes where binarily recorded "zeros" are represented by no flux change in the magnetic medium, while binary "ones" are represented by transitions from one direction of recorded flux to the opposite direction. In a (d,k) code, the above recording rules are maintained with the additional constraints that a least d "zeros" are recorded between successive "ones", and no more than k "zeros" are recorded between successive "ones". The first constraint arises to obviate intersymbol interference occurring due to pulse crowding of the reproduced transitions when "ones" are contiguously recorded. The second constraint arises in recovering a clock from the reproduced data by "locking" a phase lock loop to the reproduced transitions. If there is too long an unbroken string of contiguous "zeros" with no interspersed "ones" transitions, the clock generating phase locked loop will drop out of synchronism. For example, in a (1,7) code there is at least one "zero" inserted between the recorded "ones", and there are no more than seven recorded contiguous "zeros" between recorded "ones". It will be appreciated that runs of seven "zeros" in the recorded patterns can contribute a significant direct current (d.c.) component to the (1,7) code.

The paper entitled "Signal Processing In Recording Channels Utilizing Unshielded Magnetoresistive Heads", N. L. Koren, IEEE Trans Magn., vol MAG-26, no. 5, 1990, p. 2166 discloses a procedure for equalizing and detecting signals from an unshielded MR head in a system utilizing a (1,7) code. This equalization procedure requires measurement of the head playback response to a recorded isolated pulse. The excellent low frequency response of the unshielded MR head makes this head susceptible to saturation during playback of an isolated pulse due to the long wavelength component in such a pulse. Therefore, the response of the unshielded MR head cannot be measured by recording and playing back an isolated pulse in a straightforward manner. Additionally, the modulation code used for data recording must also be essentially d.c. free to preclude head saturation during data playback. Hence, some means is required to effectively remove the d.c. component either from the isolated pulse or from the modulation code. Write equalization, known in the art wherein high frequency pulses are added to the write current, was utilized to eliminate the d.c. component in the isolated pulses. This provided a measurable played back isolated pulse, and allowed implementation of the procedure for designing the equalizer and detector as further disclosed in the referenced paper. It also ensured saturation-free playback of the encoded data patterns by removal of the d.c component of the code at the MR head.

While the unequalized response of an unshielded MR head to an isolated pulse cannot be directly measured due to saturation effects, as stated above, the general shape of the time domain response curve may be inferred from its frequency response. FIG. 2a shows the broad skirts 14,14' of the unshielded MR head time response 16 for an assumed isolated pulse input. These characteristic skirts arise due to the excellent low frequency response of the unshielded MR head. In the teachings of the prior art, the prior art equalizer slimmed down the isolated pulse response 16 to provide a unidirectional, time limited, output pulse 18. To minimize intersymbol interference, the width of the equalized isolated pulse response of the prior art 18 was well contained in the bit interval equal to approximately twice the system minimum transition time, Tmin. As shown in FIG. 2b, Tmin is the time interval between two adjacent "1"s in the recorded waveform 15. Thus, the prior art teaches signal equalization by confining the energy of the reproduced pulse 16 to provide the slimmed, equalized pulse 18.

In view of the above, it will be appreciated that in a (d,k) code where a change in flux represents a "one", that each change of flux in the coded pattern gives rise to an output pulse of alternating polarity whose shape is similar to the equalized pulse 18 of FIG. 2a. These pulses have conventionally been detected by means of a two channel detector. The two channel detector, well known in the prior art, comprises a zero crossing peak detector and an amplitude qualifier. Referring to FIG. 3 for the played back waveforms of a typical two channel detector, an equalized bi-directional played back signal 20 is clipped at levels +Vc, 22, and −Vc,24, and the resultant signal is rectified to provide the signal 26. The signal 26 is differentiated resulting in the signal 28. It will be noted that the zero crossings of the signal 28 (e.g. 30,32,34) correspond to the peaks 36,38,40 of the original signal 20. This occurs in one channel of the two channel detector. At the times of the true zero crossings, 30, 32,34, synchronized clock signals 37,39,41 test the signal 26 to ensure the presence of the peaks 36',38' 40'. This occurs in the second channel of the two channel detector. The presence of the peaks 36',38',40' at the zero crossing times 30,32,34 allows the corresponding clock pulses 37,39, 41 to generate the output signals 43,45,47. However there are other zero crossings associated with the signal 28 which do not correspond to peaks in the original signal 20. One type of such "false" zero crossings correspond to "shoulders" (e.g. 44) in the original signal 20 which do not designate true data signals. The typical shoulder 44 results from the prior art equalized signal (18) which rapidly decays to the system baseline when there is an interval (i.e., several "0's") between played back flux changes (i.e. "1's"). The zero signal 42 in the waveform 28 does not result in an output signal occurring at clock time 35, because there is no peak signal in waveform 26 at clock time 35. (It will be noted that the signals 42',42",42"' are at the baseline due to the clipping of the original signal 20. However, they do not result in false read out signals as there are no clock signals occurring at the corresponding times.)

SUMMARY OF THE INVENTION

In a magnetic recording playback system using an unshielded MR head, the present invention discloses a playback equalizer whose response to an isolated pulse input, unlike the narrow unidirectional pulse response known in the prior art, is a bimodal, bidirectional signal having a steep zero crossing corresponding to the peak of the isolated pulse. The bimodal, bidirectional signal provided by the equalizer of the invention is further characterized by leading and trailing "skirts" resulting from the excellent low frequency response of the unshielded MR head. When the equalizer is used in combination with a d.c. free charge constrained modulation code, the presence of the skirts eliminates false zero crossings by maintaining the signal level above the system base line except at the time of a true signal zero crossing. This allows signal detection by means of a single zero crossing detection channel, and obviates the necessity of a second channel serving as an amplitude qualifier.

DETAILED DESCRIPTION OF THE INVENTION

Before describing the design of an equalizer in accordance with the invention, the method for obtaining the response of the unshielded MR head to an isolated pulse by means of a dipulse will be described. Because the signal from an isolated pulse proper will saturate the MR head on playback, a non-saturating dipulse is reproduced from which the head's response to an isolated pulse may be derived. Referring to FIG. 4, an unshielded MR head 46 reads back signals recorded on a tape 48, moving past the head 46 with a velocity v. A current source 51 provides a sense current to the MR head 46, and the varying resistance of the MR element in accordance with the signal read from the tape 48 provides a varying voltage to the preamplifier/amplifier 53. The amplified signal corresponding to the information detected from the recorded pattern appears at the point 55. Repetitively recorded on the tape 48 are dipulses 50,52 comprising alternating flux patterns, e.g. 54,56; 58,60. Each flux pattern, e.g. 54,56, consists of two flux changes separated by a time interval during recording equal to Tmin, (FIG. 2b). As the flux pattern 56 passes under the head 46, the response to a first isolated pulse 62 (FIG. 5) is generated in the head 46, followed immediately by the response of a second isolated pulse of opposite sign 64 when the pattern 54 passes under the head 46. By superposition these overlapping isolated pulse responses buck each other, and keep the MR head 46 from saturating. The resultant is the lower amplitude unequalized dipulse response 66.

As is known in the art, an equalizer is a linear network which shapes an unequalized input pulse into a desired output pulse. Referring to FIG. 6, the unequalized isolated pulse response 64 may be seen, along with the desired equalized response 67 according to the invention to be derived from the isolated pulse response 64. The desired equalized response 67 has relatively long skirts 68,70 corresponding to the long skirts 68',70' of the isolated pulse response 64, and has a fast transition time 72 to 73 equal to two times the system minimum transition time, Tmin. The desired equalized waveform 67 crosses the zero axis 74 at the time corresponding to the peak 76 of the isolated pulse response 64. The shape of the equalized pulse 67 of the invention is in marked contrast to the shape of the corresponding equalized pulse FIG. 2a, 18, of the prior art.

It will be recalled that the isolated pulse response 64 is not directly available, and that the available dipulse response 66 is the sum of the two opposite polarity, time displaced isolated pulse responses 64,62, (FIG. 5). Corresponding to the equalized pulse response 67 of the isolated pulse 64, the opposite polarity isolated pulse response 62 has the desired equalized pulse response 76, as seen in FIG. 7. The equalizer output signal when the input to the equalizer is the dipulse 66 is the sum 78 of the desired equalized responses 67,76.

The equalizer output signal is required to conform to the shape and time duration characteristics specified by the equalizer designer. These specified characteristics are embodied in the shape and duration of a "target pulse" 78, and the equalizer design process varies the parameters of the equalizer until the output pulse, for the dipulse input 66, replicates the target pulse 78.

An idealized equalized isolated pulse may be described by the following frequency domain equation.

$$F_{eql}(f) = \frac{\cos^n\left(\pi \frac{f}{2f_c}\right)}{j(f/f_c + f_L/f)} \quad 0 < f < f_c$$
$$= 0 \text{ otherwise}$$

$f_L << f_c$
$2 \leq n \leq 4$, typically

The time domain idealized equalized pulse, $f_{eql}(t)$ is derived from the inverse Fourier transform of the above equation. The equation $f_{eql}(t)$ gives rise to a bi-modal signal 67 having two peaks of opposite polarity with a distinct zero crossing in between, and a wide temporal spread outside the two peaks. The rise/fall times of the skirts of the idealized equalized pulse is inversely proportional to $f_L$, and is normally adjusted to approximate the rise/fall times of the input dipulse 66. The time between the peaks is inversely proportional to $f_c$.

The target pulse 78, to which the sum of the two idealized isolated pulse responses 67,76 is to conform, is represented by the following equation:

$$f_{tar} = f_{eql}(t + T_1/2) - f_{eql}(t - T_1/2)$$

$T_1$ is set to the minimum time between transitions of the system, Tmin, and is large enough to provide adequate signal-to-noise ratio in the playback signal, and small enough not to saturate the head.

Referring again to FIG. 4, a digitized set of values 86 of the desired equalized dipulse response 78 is derived from the $f_{targ}$ equation and are calculated by a computer 82, for use as data input 86. Also, a digitized sequence of values of the unequalized dipulse response 66 is obtained by measurements of the response of the unshielded MR head 46 to the recorded dipulses 50,52. The amplified, unequalized head signal appearing at 55 is applied to the input of a digitizer 80, such as the Model Data 6000 manufactured by Data Precision Corp., Danvers, Mass. to obtain the digitized values of the dipulse 66. The digitized values of the unequalized dipulse response 66 are entered and stored in the computer 82. A PC Model AT computer manufactured by IBM is suitable as the computer 82.

The designed equalizer is to have a transfer function such that the input dipulse 66 gives rise to an output pulse having the characteristics of the target pulse 78. By superposition, this is equivalent to the designed equalizer transforming a single isolated pulse input 64 into the waveform 67. To perform this transformation, a computer program is provided to the computer 82 which calculates a transfer function in terms of the ratio of two polynomials, each having either real and/or imaginary roots, i.e. "zeros" in the numerator and "poles" in the denominator, such that the input multiplied by the transfer function results in the desired output. The program operates on the input, i.e. the digital values of the dipulse 66, transforms it and compares it to the output, i.e. the digital values 86 of the target pulse 78. Using a least square method the program adjusts the locations of the poles and zeros of a trial transfer function about in the real-imaginary plane until the least square, difference between the input and output is substantially zero. Such programs are known in the art, and the SYSTEM IDENTIFICATION TOOLBOX program, used in conjunction with the MATLAB program, both available from The Mathworks, Inc., Natick, Mass., will provide a pole/zero format such that the input is transformed into the output. The result is a pole and zero readout 84 which specifies the transfer function of the equalizer of the invention. It will be noted that one of the zeros of the transfer function is fixed at the origin, and therefore acts as a differentiator element. This element renders the equalizer frequency response substantially zero at d.c.

Following the teaching of the invention, a practical equalizer was designed for the R-DAT (0,3) code. (The R-Dat code is described in "8/10 Modulation Codes for Digital Magnetic Recording", S. Fukuda et al, IEEE Trans. Magn., Vol. MAG-22, No. 5, September, 1986, and in "Recommended Design Standard, R-DAT", DAT Conference, April, 1986.)

It is known in the art that given the poles and zeros of the equalizer transfer function, the transfer function may be implemented in appropriate circuit hardware. Exemplary procedures are disclosed in the book, "Circuit Synthesis and Design", G. C. Temes, J. W. LaPatra, McGraw-Hill, 1977. An equalizer designed in accordance with the invention is shown schematically in FIG. 9. An alternative hardware implementation would be to use the IMP4250 Programmable Continuous-time Filter chip, available from International Microelectronic Products, San Jose, Cal. 95134.

It is also known in the prior art that (d,k) codes may be rendered substantially d.c. free by means of "charge constraint". This is accomplished by controlling the up to down level swings in the allowed patterns of the coded waveform, since each change of level results in charge transfer to or from the coupling capacitances of the a.c. networks in the associated electronics. Charge constrained codes are described in the "Magnetic Recording Handbook", Mee and Daniel, McGraw-Hill Publishing Company, 1990, pages 1118-1119 and 1122-1123. The (0,3) R-DAT code is a d.c.free charge constrained code.

The equalizer of the present invention is for use with d.c. free, charge constrained codes. Referring to FIG. 8, a recorded tape 88 having information in the form of a (d,k) charge constrained d.c. free code is read by an unshielded MR head 90. The playback signal is amplified in an amplifier 92 which feeds an equalizer 94 designed in accordance with the teachings of the invention. The output of the equalizer 94 is applied to a single channel detector 96; that is, a detector which responds only to zero crossings without the need of a second amplitude qualifying channel as taught in the prior art. A schematic of the equalizer 94 is seen in FIG. 9. Referring to FIG. 10, the output of the equalizer 94 for an input comprising a charge constrained (d,k) code shows that there are no "shoulders" on the equalized signal 100. The excellent low frequency response of the MR head 90 and the design of the equalizer obviates the signal level drop to the base line characteristic of the prior art, i.e. FIG. 3, 44. For example, the signal waveform 100 shows no tendency to decay to the base line, during the "no pulse" periods 102,104. An output will only occur at a true zero crossing, e.g. 106,108,110. The output of the single channel detector 96, may then feed an output pulse generator 98 which emits an output pulse for each zero crossing of FIG. 9 in a manner known in the art.

The invention has been described in detail with particular reference to preferred embodiments thereof, but it will be understood that variations and modifications can be effected within the spirit and scope of the invention. For example, it is known in the art that an equivalent equalizer may be implemented using a tapped delay line.

What is claimed is:

1. An equalized signal channel comprising;
   a) an unshielded MR head as input to said channel, said head characterized by an isolated pulse response which non linearly saturates said head,
   b) means for providing a dipole response from said MR head wherein said dipole response has a linear non saturating response,
   c) means for processing said dipulse response to obtain therefrom the response of said channel to a derived non saturating isolated pulse signal characterized by a symmetrical, single peak waveform having leading and trailing skirts, said single peak waveform being unipolar with respect to its baseline, and
   d) equalization means cooperating with said means for processing said dipole response, said equalization means for providing as an equalized output signal waveform corresponding to said derived non saturating isolated pulse, a bi-modal signal waveform antisymmetrically situated with respect to said equalized output signal waveform's baseline, said equalized output signal waveform having a first peak of a first polarity and a second peak of a second polarity relative to said baseline, a waveform segment connecting said first and said second peaks said segment traversing said baseline so that said segment crosses said baseline at the time substantially the same as the occurrence of said single peak of said single peak waveform, and said equalized output signal waveform of said channel further characterized by having leading and trailing skirts of a length much greater than the time interval between said first and said second peaks.

2. An equalized signal channel comprising;
   a) signal means as input to said channel for providing an isolated pulse signal characterized by a symmetrical, single peak waveform having leading and trailing skirts, said single peak waveform being unipolar with respect to its baseline, and having the shape of waveform 64 in FIG. 6, and
   b) equalization means cooperating with said signal means and operating as a differentiator and a slimmer, said equalization means for providing as an equalized output signal waveform from said channel a bi-modal signal waveform anti-symmetrically situated with respect to said signal waveform's baseline, said signal waveform having a first peak of a first polarity and a second peak of a second polarity relative to said baseline, a sharply sloped waveform segment connecting said first and said second peaks, said segment traversing said baseline, and said equalized output signal waveform of said channel further characterized by having gradually sloping leading and trailing skirts of a length much greater than the time interval between said first and said second peaks, and having the shape of waveform 67 in FIG. 6.

3. The equalized channel of claim 2 wherein said signal means is a magnetoresistive head.

4. The equalized channel of claim 3 wherein said magnetoresistive head is an unshielded magnetoresistive head.

5. The equalized channel of claim 2, wherein said waveform segment traversing said baseline intersects said baseline at the time corresponding to the time of occurrence of said single peak of said isolated pulse response.

6. The equalized channel of claim 2, wherein the frequency response of said channel is zero at d.c., whereby said channel is substantially immune to low frequency input noise.

7. A method of manufacturing an equalizer circuit comprising the steps of:
   providing a magnetic media having recorded thereon dipulses comprising alternating flux patterns, each flux pattern including two flux changes separated by a predetermined time interval, which is chosen to be small enough so as not to saturate an unshielded magnetoresistive (UMR) head, but large enough to generate an adequate signal thereby;
   reproducing said dipulses recorded on said magnetic media by means of an unshielded magnetoresistive head to produce a dipulse signal;
   digitizing said dipulse signal to produce a digital dipulse signal;
   using a digital computer,
   (a) calculating a target response of said equalizer to an idealized dipulse response signal;
   (b) comparing said target output response to said digital dipulse signal;
   (c) as a result of said comparison, determining the locations of poles and zeros in said equalizer's transfer functions, and
   manufacturing said equalizer circuit from electronic components, based on said determined locations of said poles and zeros in said equalizer transfer function, wherein said equalizer circuit operates on an input signal to differentiate and slim it to produce an output signal.

8. The method of claim 7 wherein said manufacturing step manufactures said equalizer circuit from appropriate resistors, capacitors and/or inductors.

9. The method of claim 7 wherein said manufacturing step manufactures said equalizer circuit by programing a programmable continuous time filter chip according to poles and zeros locations determined by said determining step.

10. The method of claim 7 wherein said equalizer circuit manufactured in said manufacturing step has the characteristic of equalizing a signal having the shape of waveform 64 in FIG. 6 input to said equalizer circuit to produce an output signal having the shape of waveform 67 in FIG. 6.

11. The equalized channel of claim 1, wherein the frequency response of said channel is zero at d.c., whereby said channel is substantially immune to low frequency input noise.

* * * * *